C. C. ESTES.
Hemp Brake.
No. 4,114.
Patented July 14, 1845.
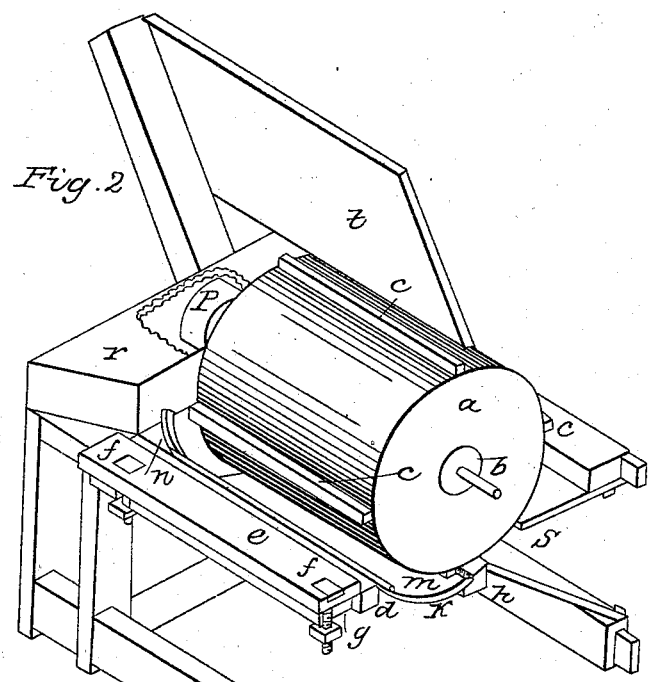
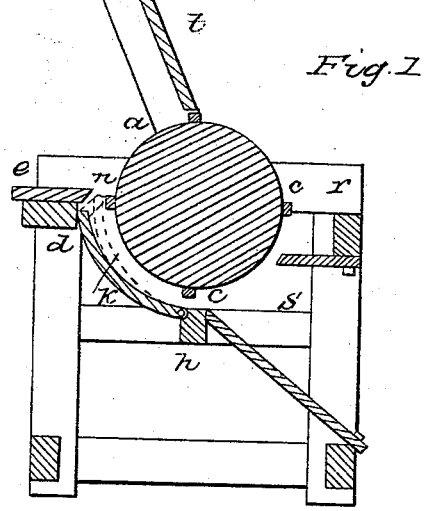

UNITED STATES PATENT OFFICE.

COLEMAN C. ESTES, OF MAURY COUNTY, TENNESSEE.

IMPROVEMENT IN HEMP-MACHINES.

Specification forming part of Letters Patent No. 4,114, dated July 14, 1845.

*To all whom it may concern:*

Be it known that I, COLEMAN C. ESTES, of the county of Maury and State of Tennessee, have invented a new and Improved Revolving Hemp-Brake for the Breaking and Cleaning of Hemp and Flax; and I do hereby declare the following to be a full and exact description, reference being had to the accompanying drawings, making a part of this specification—

Figure 1 being a cross-section, and Fig. 2 a perspective elevation with one end removed.

To enable others skilled in the art to make and use my invention, I will proceed to describe its construction and operation.

I construct the frame of my machine of suitable size and strength in any known or usual manner. I then place in the same a solid cylinder or drum, $a$, which revolves on the journals $b$. Around the periphery of the cylinder $a$ I attach square beaters $c\ c$. The upper front side piece, $d$, of the frame has its upper side level with the center of the beating-cylinder. Upon the upper side piece, $d$, I place a movable and adjustable rest, $e$, over which the hemp or flax is broken by the revolving beating-cylinder $a$. The rest $e$ is confined in any desired position by the screws $f\ f$, the heads of which are countersunk into the upper side of the rest, and their shanks pass down through slots $g\ g$ in the side piece, $d$, immediately under the rest. The slots or mortises $g\ g$ allow of the rest being placed at any desired distance from the beaters upon the beating-cylinder $a$, and is secured by nuts on the lower ends of the screws $f\ f$. Under the center of the beating-cylinder $a$, at the distance of a few inches, I run a strong piece of timber or iron, $h$, parallel with the same. To the central piece, $h$, I secure by hinges a concave, $k$, of about one-fourth the circumference of the beating-cylinder. The front edge of the concave $k$ projects forward and upward, so as to partially embrace the beating-cylinder, and is supported by projecting points $m\ m$ at each corner, resting in the grooves or mortises $n\ n$ in each end of the frame of the machine. The points $m\ m$ work freely in the mortises $n\ n$, so that the concave can be raised nearer to the beating-cylinder, or lowered, at the pleasure of the person operating the machine.

P is a pulley on the shaft of the beating-cylinder, by which motion is communicated to the same. The driving-pulley P is inclosed in the box $r$, for the purpose of preventing the hemp from being drawn around the pulley or axle.

The operation of my improved machine for breaking and cleaning hemp is as follows: After adjusting the rest $e$ to a suitable distance from the beating-cylinder $a$ and putting the cylinder in motion at a speed of about a thousand revolutions per minute for a cylinder of three feet in diameter, I take a handful of retted hemp of suitable size and pass it in between the rest and concave and the revolving beaters about one-half its length. I then withdraw it, and insert the other end, allowing it to pass into the machine up to the point where the first end inserted was broken. By this operation the hemp is thoroughly broken, the concave keeping the fibers straight while it is being broken. To perfectly clean and perform the swingling or scutching operation, I pass the handfuls of hemp a second time in between the rest and concave and the beaters, the scutching operation being performed by pressing with the knee or foot, by the aid of a lever or otherwise, the concave $k$ up nearer the beating-cylinder, by which means the broken hemp is brought nearer to the beaters, and every particle of dirt or woody substance is thoroughly separated from the lint.

In the accompanying drawings one end of the machine is removed for the purpose of showing the internal arrangement thereof.

$s$ is a flue in the rear of the beating-cylinder, for allowing the dirt and shives to escape.

$t$ is a plank screen placed over the beating-cylinder, for preventing dust or dirt being thrown upon the person operating the machine.

What I claim as my invention, and desire to secure by Letters Patent, is—

The combination of the revolving beating-cylinder $a$, movable and adjustable rest $e$, and hinged concave $k$, all arranged and operating with the flue $s$ and screen $t$, substantially in the manner and for the purpose herein described and set forth.

COLEMAN C. ESTES.

Witnesses:
Z. C. ROBBINS,
T. C. DONN.